T. H. Corbett,
Belt Fastener.
N° 13,843.  Patented Nov. 27, 1855.
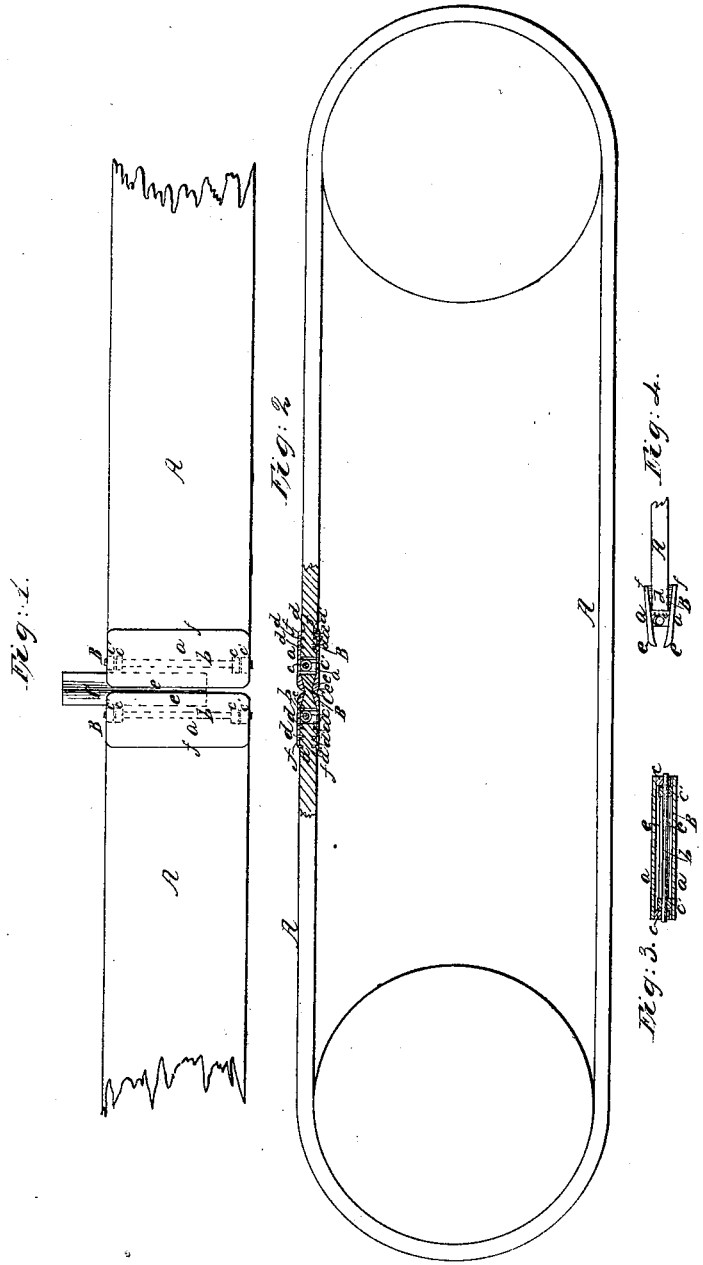

UNITED STATES PATENT OFFICE.

THOS. H. CORBETT, OF BROOKLYN, NEW YORK.

BELT-COUPLING.

Specification of Letters Patent No. 13,843, dated November 27, 1855.

*To all whom it may concern:*

Be it known that I, THOMAS H. CORBETT, of Brooklyn, in the county of Kings and State of New York, have invented a new and useful Belt-Coupling; and I do hereby declare that the following is a full, clear, and exact description of the same, reference being had to the accompanying drawings, forming part of this specification, in which—

Figure 1, is a plan of my improved coupling applied to a belt. Fig. 2, is a vertical transverse section of the same, applied to a belt which is shown passing around pulleys. Fig. 3, is a vertical longitudinal section of one section of the coupling, detached. Fig. 4, is a detached cross section, illustrating the operation.

Similar letters of reference in each of the several figures indicate corresponding parts.

The object of my invention is to avoid the great inconvenience experienced in coupling the two ends of a belt together by any of the methods at present adopted, it preventing all possibility of the ends separating of their own accord and yet allowing of their being separated with ease, convenience and facility by hand, when necessary, it also avoiding a projection being formed on the belt at the junction of its two ends and thus rendering the belt capable of passing over pulleys smoothly or without jumping or causing additional friction and wear.

The nature of said invention consists in coupling the two ends of a belt together by means of two clamps and a double wedge shaped key, in the manner hereinafter shown.

To enable others skilled in the art to make and use my invention, I will proceed to describe its construction and operation.

A, Fig. 2, represents a belt passed around pulleys and coupled together. B, B, are the two clamps placed on the ends of the same, and C, the double wedge shaped key, which causes the clamps to bite or take firm hold on the ends of the belt and which also couples the two clamps together. Each of the clamps B, is formed of two plates, $a$, $a$, which are hinged together near the center of their width by a bolt $b$, which passes from end to end through eyes, $c$, $c$, $c'$, $c'$, formed on the upper and lower plates, as shown in Fig. 3. A number of teeth or ribs $d$, $d$, $d$, $d'$, $d'$, $d'$, are formed on the inner faces of these plates, which serve for insuring the hold of the clamps upon the ends of the belt, they taking into the leather, as shown, when the double wedge shaped key is driven home. To attach these clamps to the ends of the belt, it is necessary to open them as shown in Fig. 4, by pressing upon the plates $a$, $a$, at $e$, insert the end of the belt and then again close the jaws, by pressing upon them at $f$; this being done the double wedge key is inserted, in the manner illustrated in Fig. 1, between the plates of both clamps and then driven home as in Fig. 2. As the wedge passes home, it closes the jaws of the clamps still tighter together owing to its shape and the plates or jaws being hinged out of the center of their width and thus causes the ribs or teeth $d$, $d'$, to take fast into the leather of the belt and thus couple the two ends of the belt together in the most secure and perfect manner. By making the wedge a little taper it might be caused to remain more securely in its place after being driven home.

By this method of coupling the two ends of the belt together it may be evident that, when the strain is greatest upon the coupling the firmer its hold will be, owing to the use of the wedge key in connection with clamps which have their jaws hinged slightly out of the center of their width.

This coupling is very simple, cheap and durable and can be used to advantage in all cases where it is desirable to have two objects united together, in such a manner that it shall be impossible for them to separate of their own accord, and at the same time, in cases of necessity, an instantaneous disconnection may be effected by hand.

Belts are usually united together by sewing or lacing, but this method is not good, as the thread soon wears out and allows the ends to separate. A buckle also is sometimes used but is found not to answer well owing to the lump or projection being formed at the junction of the ends, which interferes with the free passage of the belt around the pulleys. With my invention these difficulties are totally overcome, as must be obvious.

What I claim as my invention and desire to secure by Letters Patent, is,

Coupling the two ends of a belt, or any two objects together by means of two clamps, B, and a double wedge key, C, substantially as and for the purpose set forth.

THOS. H. CORBETT.

Witnesses:
S. H. WALES,
J. W. COOMBS.